United States Patent [19]
Senften

[11] 3,772,919
[45] Nov. 20, 1973

[54] BALANCING APPARATUS FOR ROTATING BODIES AND METHOD OF PRODUCING FREQUENCY STABLE PHASE DELAY

[75] Inventor: David A. Senften, Florissant, Mo.

[73] Assignee: Hunter Engineering Company, Bridgeton, Mo.

[22] Filed: Feb. 9, 1972

[21] Appl. No.: 224,833

[52] U.S. Cl. .................................. 73/457, 73/466
[51] Int. Cl. ............................................ G01m 1/00
[58] Field of Search .................... 73/457, 466, 467; 328/146; 307/262, 261

[56] References Cited
UNITED STATES PATENTS
2,383,405  8/1945  Merrill et al. ........................ 73/457
2,656,713  10/1953  Allen ................................... 73/457

Primary Examiner—James J. Gill
Attorney—Frederick M. Woodruff et al.

[57] ABSTRACT

Apparatus through which the orientation of an unbalancing mass of a supported rotating body may be determined electronically. In arriving at the orientation determination a signal is generated corresponding to the resulting vibratory motion of the unbalanced rotating body, a frequency stable phase delay is produced by the electronic system and is applied to the generated signal, and a stroboscopic light is triggered by the delayed signal so as to illuminate the rotating body periodically and is coordinated with the known fact that in a rotating unbalanced body there is a 90° lead between the forcing function produced by the rotational velocity and position of the unbalancing mass and the resulting vibratory acceleration of the body when the rotational speed coincides with the natural resonant frequency of the supported rotating body.

11 Claims, 7 Drawing Figures

PATENTED NOV 20 1973 3,772,919
SHEET 1 OF 2
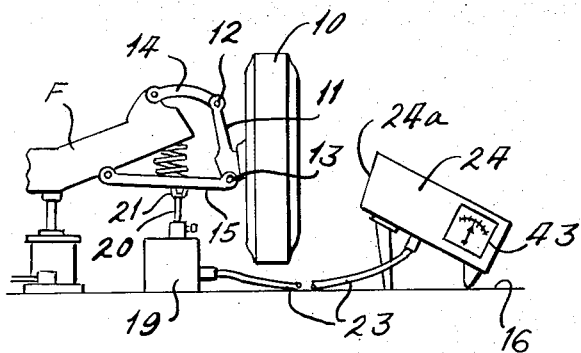
FIG. 1
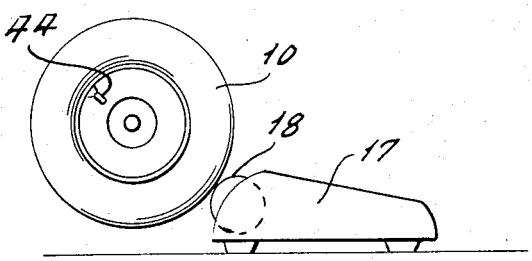
FIG. 2
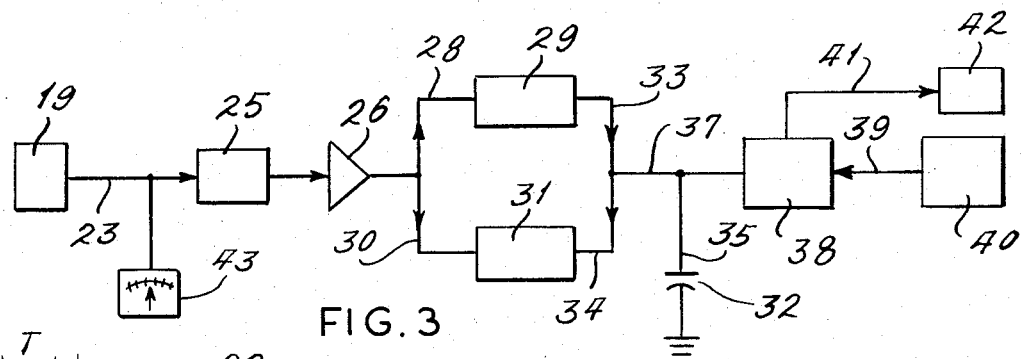
FIG. 3
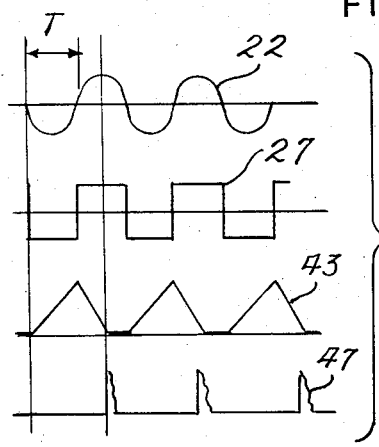
FIG. 3A
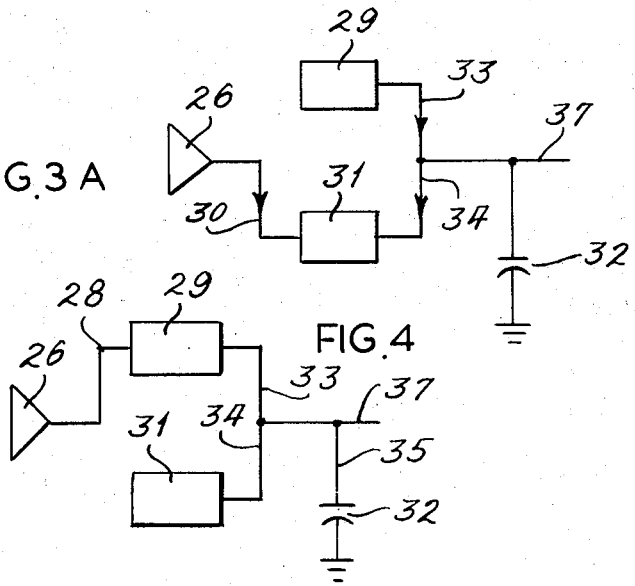
FIG. 4
FIG. 5

BALANCING APPARATUS FOR ROTATING BODIES AND METHOD OF PRODUCING FREQUENCY STABLE PHASE DELAY

BACKGROUND OF THE INVENTION

This invention relates to apparatus by which the unbalance condition of a rotating body may be detected and its orientation determined, and to a method of electronically producing a frequency stable phase delay which facilitates determining the orientation of the unbalancing mass of the rotating body.

The balancing of a rotating body has heretofore been accomplished in several ways. One way is to mount a mechanical counter-balancing device on the body whose unbalance is to be corrected. Such a device or its equivalent apparatus may be applied to either a body rotating about a fixed axis or one having an axis of rotation that moves in response to rotational unbalance. Apparatus of the type mounted directly on a rotating body requires great care in its attachment, especially when the rotating body is or must be rotated at high speed in order to reach the critical unbalance conditions for which a correction is required.

Another way to correct unbalance in a rotating body, when the body is rotated on a supported axis that can move or is not fixed, is by the use of stroboscopic apparatus which illuminates the rotating body periodically as it rotates, and is not directly mounted thereon. Conventional stroboscopic type unbalance detection apparatus utilizes a velocity pick-up which follows the vibratory motion of the rotating body and its axis of rotation and generates a corresponding signal which is passed to a resistive- capacitive network. The network provides the required 90° phase shift needed to properly synchronize the stroboscopic illumination with the rotating body so as to determine the orientation of the unbalance. When a single resistor and capacitor are used, the capacitive reactance must be much larger than the resistance of the resistor. Even so, a phase shift of 90° can only be approached because of the finite values of the resistor and capacitor which are practical. This introduces a problem particularly at low frequencies, since the capacitive reactance is inversely proportional to the applied frequency and can change by large percentages. Also, such a resistive-capacitive network greatly attenuates the signal from the pick-up and therefor requires more amplification. When multiple resistive-capacitive networks are employed, a full 90° phase shift can be obtained. Again there is a problem, since the value of the capacitive reactance is frequency determined, the angular phase shift changes caused by change in frequency are multiplied correspondingly. As a result, such a multiple network is useful at only one frequency. This restriction is incompatible with some present balancing techniques. Further, restrictions on the pick-up signal for accuracy are that the signal must be generally sinusoidal and have evenly spaced zero crossings and peaks.

The proposed apparatus, on the other hand, is capable of utilizing a signal from a pick-up attached to a rotating body having any amplitude and any wave shape so long as the wave has symetrical zero crossings. It will handle any frequency in a band of many decades, limited only by the accuracy required and the frequency limitations of the active components used. The improved apparatus can provide frequency insensitive phase shifts from almost zero degrees up to 180°. Variations can be made in the network so that the only restriction is that the incoming signal from the rotating body is cyclic.

In a preferred embodiment of this invention a signal, generated by the vertical vibratory motion of a rotating unbalanced body and its supported but movable horizontal axis of rotation being of a cyclic and sinusoidal form is passed through a limiting device which prevents the voltage excursions from becoming large enough to damage the signal amplifier. The amplifier used is of high enough gain to provide a switching signal for a constant current source and a constant current drain which is synchronous with the zero crossing of the incoming signal. In such a network, when the output of the amplifier is negative the constant current source is activated and the constant current drain is held off. Therefore, during the time interval when the amplifier output is negative the current enters a capacitor, and the voltage in the capacitor rises above some reference level at a rate of $I_s/C_e$ volts per second, where $C_e$ is the capacitance of the capacitor and $I_s$ is the value of the current from the current source. The voltage in the capacitor at the end of the negative half cycle will then be $I_s T/C_e$ where T is the period of the negative half cycle. When the output of the amplifier goes positive the constant current source is cut off and the constant current drain is activated, thereby decreasing the voltage in the capacitor at a rate of $I_d/C_e$ volts per second. When the voltage in the capacitor again reaches the reference voltage supplied by the reference voltage generator device, a comparitor device clamps the capacitor voltage at that level and simultaneously emits a timing pulse which activates a light source. From this brief explanation it can be understood that if $I_d$ equals twice $I_s$, the timing to discharge the capacitor back to the reference voltage will be exactly one half as long as the time to charge the capacitor. This exactly provides a 90° phase shift. It can also be understood that by changing the ratio of $I_s$ to $I_d$ any phase shift from almost zero degrees to 180° can be obtained. The phase delay of such a circuit network is insensitive to the changes in the frequency of an incoming signal produced by a rotating body being examined for unbalance. The circuit network thus constituted is not only unique for its versatility, but yields a new and unique method for producing a frequency stable phase delay and its application to unbalance detecting apparatus greatly simplifies and overcomes a great many of the difficulties present in more conventional apparatus and the networks thereof.

An important commercial use of the improved network is in the detection of the unbalance of vehicle wheels. The following details will be directed to setting forth the application of the present improvements to vehicle wheel unbalance detection, but no limitation is to be imputed thereto.

The important objects of the present invention are to provide a simple and inexpensive network for activating stroboscopic means for detecting the unblanace of a rotating body, to provide a network which is insensitive to frequency variations, to provide a method of electronically detecting unbalance in a rotating body that avoids the difficulties heretofore experienced, to provide means for obtaining a frequency stable 90° phase shift thus making the means useful for examining with great accuracy the unbalance in a rotating body and determining the orientation of the unbalance condition, and to provide means for obtaining frequency stable phase shifts of other than 90° thus making the means useful for examining with greater ease the unbalance of driven vehicle wheels.

The invention resides in the apparatus and network set forth and described in the following specification.

BRIEF DESCRIPTION OF THE DRAWINGS

The invention is disclosed in one preferred embodiment of apparatus by which the principles may be easily understood, the apparatus and the circuit network being illustrated in the accompanying drawings, wherein:

FIG. 1 is a schematic view of apparatus for detecting the unbalance condition of a vehicle wheel;

FIG. 2 is a schematic view in elevation of the vehicle wheel seen at line 2—2 in FIG. 1;

FIG. 3 is a circuit diagram showing the components thereof;

FIG. 3A is a composite wave form diagram relating the wave forms generated at the pick-up unit and the amplifier, and the reference voltage condition in relation to the flash discharge of the stroboscopic lamp;

FIG. 4 is a modified circuit diagram;

FIG. 5 is a further circuit diagram modification; and

DESCRIPTION OF THE PREFERRED EMBODIMENT

Figure 6:
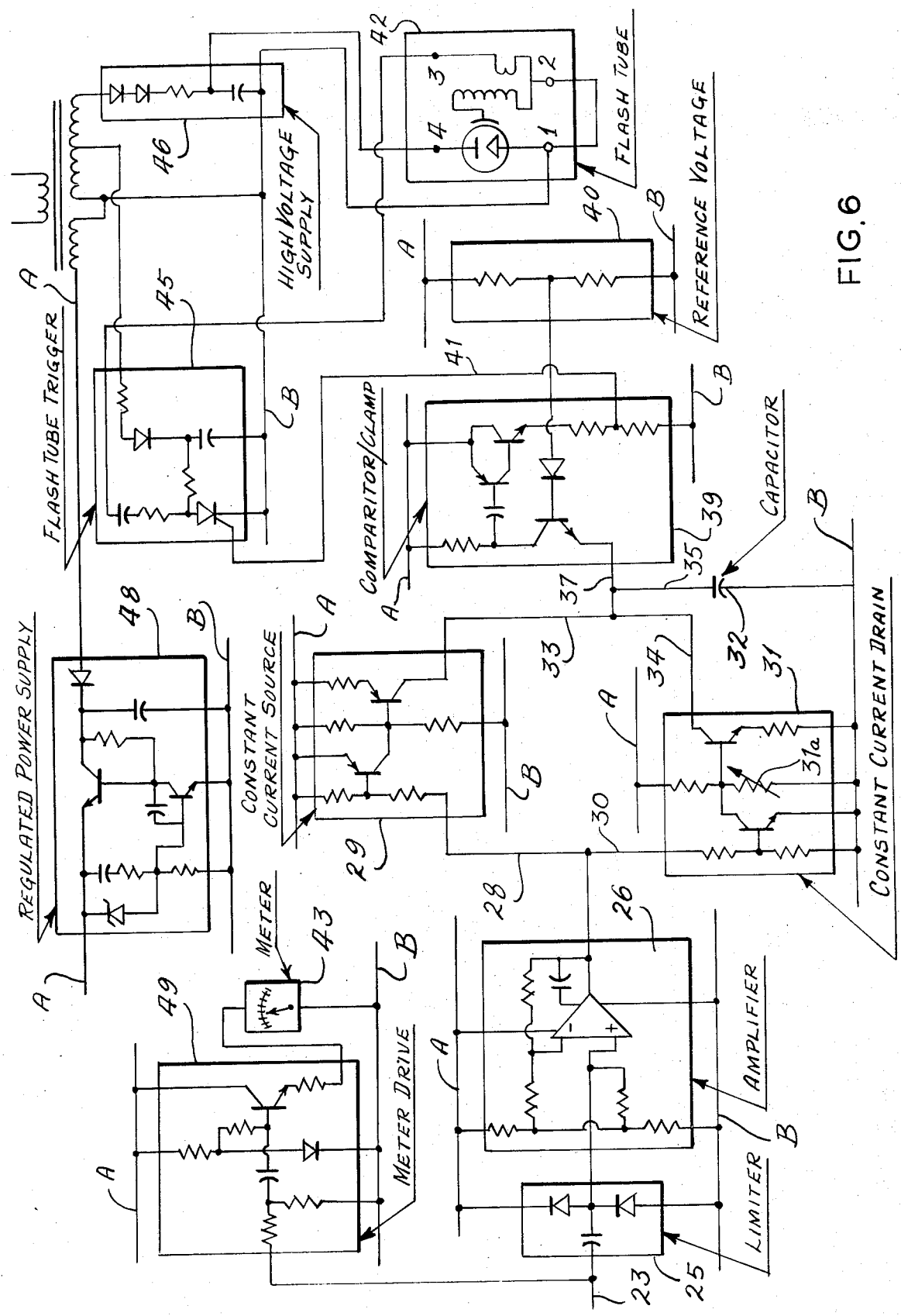
FIG. 6 is a more detailed electronic circuit layout to disclose the various components including a variable constant current drain by which the ratios may be selected for determining the frequency stable phase delay from near zero to 180°.

In FIG. 1 there is illustrated a vehicle wheel 10 which is the body whose unbalance is to be detected. The wheel 10 is mounted in a conventional manner from its spindle bracket 11 by upper and lower ball-type joints 12 and 13 respectively on the suspension arms 14 and 15 attached in the usual manner to the vehicle frame only partly seen at F. The wheel 10 is elevated above the floor 16 a suitable distance by a jack J for free rotation by a conventional spinner device 17 (FIG. 2) having a motor driven friction wheel 18 in contact with the thread of the wheel 10.

In view of FIG. 1 a voltage generator device 19 is disposed on the floor 16 in a position where its plunger rod 20 may be adjustably elongated to place a magnetic adapter 21 in contact with the lower suspension arm 15. The unbalanced condition of the wheel when rotated produces a cyclic up and down response in the wheel 10, and this motion causes the plunger rod 20 to reproduce the wheel motion. The device 19 contains a reciprocable electromagnetic voltage generator in which a permanent magnet element is attached to the rod 20 so it moves with the wheel 10. This permanent magnet is electrically coupled to a core piece having a pick-up coil. As the permanent magnet moves due to wheel unbalance the magnetic flux paths are varied in a regular cyclic manner to induce a voltage in the pick-up coil proportional to the vertical velocity of the wheel and suspension system. This signal and the cyclic motion of the wheel 10 are generally sinusoidal in nature and is shown at 22 in FIG. 3A. Since the type of voltage generator 19 is of generally known character it is believed unnecessary to illustrate the same, but reference may be had to the pick-up unit 28 of the Merrill et al. U.S. Pat. No. 2,383,405 granted Aug. 21, 1945.

The sine wave voltage signal from the pick-up device 19 is fed by a connective lead 23 into the electronic assembly housed in a case 24. The voltage signal (FIG. 3) is fed to a limiter device 25 for the purpose of preventing the voltage excursions from becoming large enough to damage an amplifier 26 in circuit with the limiter device 25. The amplifier 26 is of high enough gain to provide a switching signal of square wave form shown at 27 in FIG. 3A. The amplifier output is connected by lead 28 to a constant current source device 29 and by lead 30 to a constant current drain device 31. The amplifier output signal switches synchronously with the zero crossing of the incoming signal from lead 23.

When the output of the amplifier 26 is negative the constant current source is activated to supply a current $I_s$ to a capacitor 32 by leads 33, 34 and 35. The voltage rise in the capacitor 32 is at a rate equal to $I_s/C_e$ volts per second, and is represented by the wave form 43. The symbol Ce is of the capacitance of the capacitor 32. At the end time T of the negative half cycle the voltage in the capacitor 32 will be $I_sT/C_e$.

When the output of the amplifier 26 goes positive the constant current source 29 is cut off and the constant current drain device 31 is activated through lead 30 and acts to drain the voltage in the capacitor 32 at a rate $I_d/C_e$ volts per second. In circuit by lead 37 from the capacitor 32 is a comparitor device 38 which is connected by lead 39 to a reference voltage supply device 40. The device 38 is responsive to the reference voltage value established by device 40 so that when the voltage is drained from the capacitor 32 and reaches the level of the reference voltage output of device 40, the comparitor clamps the capacitor voltage at that level and sends out a timing pulse along lead 41 to a flash tube device 42.

In order to obtain exactly a 90° phase shift (lagging) the ratio of current drain $I_d$ caused by the constant current drain device 31 must be twice as fast as the current $I_s$ supplied by the constant current source device 29. Using this ratio the time to discharge the capacitor back to the reference voltage value $V_r$ established by the reference voltage device 40 will be exactly one half as long as the time to charge up the capacitor 32 as shown by the curve 43 in FIG. 3A.

The circuit network shown in FIG. 3 is housed in the case 24 (FIG. 1) with the flash tube device 42 mounted at the outer end 24a of the case so it can periodically direct its light toward the rotating wheel 10. The case 24 displays a suitable meter 43 by which the amplitude of the wheel vibration may be observed electrically.

The circuit diagram of FIG. 3 is schematically shown as it is to be understood that the various components incorporate generally standard solid state (where possible) networks. For example, the components referred to may be assembled on plug-in boards for easy manufacturing and servicing. As will appear presently the ratios by which the functions of the constant current source and constant current drain are carried out may be selected by inserting the desired plug-in boards for the devices 29 and 31. To change the ratio of charging to discharging (draining) of the capacitor 32, the constant current drain 31 might be the only plug-in board that has to be changed, or the device 31 may be provided with a variable resistor, as shown in 31a in FIG. 6.

It is, of course, understood from studies of rotating bodies that the rotational position of a mass concentration leads the vibratory acceleration of the body by 90° at the critical resonant frequency (See FIG. 3A). Hence, the electronic network is arranged to account for this fact.

Turning now to FIG. 2, a reference spot is selected on the wheel 10, and this may be the valve stem 44. As the wheel 10 is rotated by the spinner 17 the flash tube device 42 will periodically illuminate the face of the wheel, and the operator can observe the location of the valve stem 44. The operator can determine the amount of vibratory motion by observing the motion of the pointer on the meter 43. After the wheel 10 has been driven up to and beyond a speed which emphasizes the unbalance vibration, it is allowed to coast. As the wheel slows down the meter pointer will swing and reproduce the amplitude of the wheel vibratory motion. At some point (the resonant frequency point) the meter reading, which has been generally decreasing as the wheel speed slows, will begin to show an increase in the amplitude. The operator uses this meter reaction as an indication of the proper time to note the location of the valve stem 44. At the point when the amplitude reaches a peak indication on the meter 43 the location of the valve stem 44 is noted. The orientation of the unbalance mass will now be such as to lie at the bottom of the wheel or be close to the bottom when the strobe light flashes. The wheel 10 is then stopped and the operator must then turn the wheel so that the valve stem 44 is at the location observed at the peak point of the vibration. Having done this, a counterbalancing weight of suitable value, as determined by the meter reading, is attached to the rim of the wheel at the top. The operator may check the balance by spinning the wheel again and noting the reading of the meter 43. If an unbalanced condition still exists the weight added on the first run-up of the wheel 10 may be too small or too large. If it is too small the weight will appear in the strobe light to be at the top or the 12 o'clock position, and if it is too large the weight will appear at the bottom or 6 o'clock position.

In FIG. 4 the solid state electronic circuit, though not completely shown, has all of the components heretofore described in FIG. 3, and no further description is needed. The modification consists in removing the lead 28 from the amplifier to the constant current source 29 so that the current source 29 is constantly supplying current. This change requires that the constant current drain 31 should do the work of accepting the current supply and discharging the capacitor 32 within the ratios needed for securing a 90° phase shift, or a phase shift of any desired amount from almost zero to 180°.

The circuit of FIG. 5 differs from the circuit of FIG. 3 by doing away with the lead 30 from the amplifier 26 to the constant current drain 31. This is a variation from the circuit of FIG. 4, and in such a variation the constant current source 29 must supply current at the proper times to supply the current drained by device 31 and charge the capacitor.

It is, of course, understood from the above description that the circuit of FIG. 3 or variations thereof as noted, makes it possible to electronically detect unbalance in a rotating body by a new and unique method and with improved apparatus. One of the important improvements is that the circuit is insensitive to frequency changes. While the circuit of FIG. 3, or either of the variations thereof as shown in FIGS. 4 and 5, is believed to present a new and unique method of providing a frequency stable phase delay which can be used in detecting unbalance of any rotating body subject to displacement or periodic motion in space, one of its prevailing commercial uses is associated with the detection of unbalance in vehicle wheels. The apparatus provides an exceedingly simple way of removing the unbalance by determining the proper location for and approximate amount of corrective weights, as is heretofore fairly well understood in the automotive service field. In the present case the improved circuit of FIG. 3 is applied to the vehicle wheel unbalance proglem as shown in FIGS. 1 and 2.

The apparatus of FIGS. 1 and 2 is presented in connection with the determination of unbalance in an undriven wheel of a vehicle. It has heretofore been pointed out that the pick-up unit 19 is disposed below the lower suspension arm 15 for the wheel 10 such that its adjustable plunger rod 20 can be set so that a horseshoe magnet 21 just engages a surface of the arm 15. A spinner unit 17 has its drive friction wheel 18 applied to the tread of the wheel 10 in order to rotate the wheel up to speeds which will carry the mass of the wheel through the critical vibration zone. During the run up of the wheel 10 the pick-up unit 19 will follow the vertical vibrations of the suspension arm 15 and produce a voltage which is proportional to the vertical velocity of the arm and is conducted by lead 23 into the electronic circuit of the character of that shown in FIG. 3 which is housed in the case 24. Prior to rotating the wheel 10 a reference spot must be selected and for this purpose the valve stem 44 is convenient. As the wheel 10 is rotated through its critical vibration zone the stroboscopic light 42 is caused to flash periodically and the face of the wheel 10 is illuminated. During the periods of illumination of the wheel 10 the position of the valve stem can be noticed and the valve stem may precess, or move slowly, around the wheel. Once the speed of the wheel 10 has been carried beyond its critical vibration point the spinner 17 is removed and the wheel is allowed to decelerate gradually, during the course of which the critical vibration speed is again passed through. During this critical vibration period the operator will observe the position of the valve stem 44 as it is periodically illuminated by the flashes of lamp 42 and will note where the valve stem appears to be. The valve stem appears to be precessing slowly due to the fact that the lamp 42 always flashes 90° after the pick-up signal passes through the positive going zero crossing and the disturbing mass is not at a definite point in the circle of rotation because of the reaction of the wheel system to the mechanical resonance phenomenon. We do know, however, that when the rotating system of the wheel is exactly at the resonance speed, the rotational position of the disturbing mass will always be found leading the resultant vibratory motion acceleration by 90°. The phase shift network described earlier is interposed in the electronics of the strobe balancer so as to show an image with the orientation of the mass concentration at the 6 o'clock or bottom position of the wheel 10 for ease of understanding for the operator. As noted before, the rotating wheel 10 is brought to a stop and is manually moved until the valve stem 44 is located in the same clock dial position as observed when the wheel 10 passed through its resonant vibration speed, as noted on by the peaking of the reading of the meter 43, during wheel deceleration. Having located the wheel 10 in accordance with the foregoing description, a suitable balancing weight is placed at the 12 o'clock position so that the same will be diametrically opposite the unbalancing mass. It may be necessary to spin the wheel 10 through several cycles in order to determine if the balancing weight should be placed on the inside of the wheel rim or if the required balancing weight should be split with part on the inside of the rim and part on the outside of the rim. This is due to possible dynamic balance problems.

While the electronic circuit network has been schematically shown in FIGS. 3, 4 and 5, the preferred solid state network is more completely disclosed in FIG. 6 and reference will now be made to that view. The cyclic voltage signal from the generator 19 is transmitted along lead 23 to the limiter 25 where an excessively high voltage excursion is prevented so as to protect the amplifier 26. It is noted at this time in the description of the network of FIG. 6 that the opposite sides of the power source are denoted by the letters A and B. Therefore, all of the incomplete leads designated by the letters A are to be connected and all of the incomplete leads B are similarly required to be connected in order to make a complete circuit. The method for showing the opposite sides A and B of the complete electrical circuit has been selected since it greatly simplifies the circuit layout.

Still with reference to FIG. 6, the output of the amplifier 26 is directd by lead 28 to a constant current source 29 which embodies a solid state transistorized circuit. The current source is connected by lead 33 to the lead 37 which is connected by lead 35 to a capacitor which is to be charged up to a desired voltage level. The activation of the constant current source 29 occurs during the negative half cycle of the square wave shown at 27 in FIG. 3A. During the positive half cycle of the square wave 27 the constant current drain 31 is activated by the amplifier 26, and as a result through the leads 34, 37 and 35, the capacitor 32 has its voltage reduced until it reaches the reference voltage generated by device 40. When the reference voltage and the voltage of capacitor 32 are equal the comparator 39 activates through the lead 41 a flash tube trigger device 45 which is in circuit with the flash tube assembly 42 and a high voltage supply 46. As a consequence of the flash tube trigger 45 powering the flash tube 42 a burst of light is emitted from the end 24a of the case 24 (FIG. 1). The action of the comparator and clamp device 39 results in a pulse (see the pulse wave form 47 in FIG. 3A at the time when the capacitor voltage 32 is drained down to an equality with the reference voltage generated by the device 40.

Still referring to FIG. 6 there is shown the solid state circuit arrangement of a regulated power supply means being connected to the metered drive circuit 49 by which the meter 43 is energized to show the vibration characteristics of the rotating body 10. The excursion of the meter needle along the scale can be used to indicate the amount of corrective weight required to overcome the unbalancing mass. Thus, the scale is usefully plotted in terms of weight values, such as ounces. It is believed unnecessary to described in complete detail all of the components shown in FIG. 6 as these components per se are believed to be well known to those skilled in the art.

In the foregoing description, the known facts about unbalanced rotating bodies not having a fixed axis of rotation are similar to a mass suspended by a spring and undergoing forced vibration when it oscillates under the influence of an external time-dependent disturbance. Now when such a body rotates at a velocity which causes a vibration that can be sensed, either physically or visually, such vibrational frequency information can be usefully applied to the problem of locating the mass that is causing the unbalanced condition to exist. In certain cases, as noted above, the sensible frequency range can be monitored by a meter in an electronic system. In other cases where it is difficult to watch a meter, the operator can personally pick-up a sensible frequency period and relate it to a meter reaction that can then be used in relation to the stroboscopic light flashes to locate a mark or index point on the rotating body.

In actual practice it has been found that the use of the "peak" balancing technique is somewhat unhandy when balancing a vehicle's driven wheels. These wheels are generally spun by the vehicles motor and drive train system during the balancing procedure. It is difficult, therefor, for an operator at the controls of the vehicle to observe the peaking on the strobe meter and control the wheel speed properly. A more convenient technique has been developed whereby the operator adjusts the speed of the driven wheels, using the vehicles motor and drive train, to a speed where he perceives a sensation of maximum or "peak" vibration being transmitted through the body of the vehicle. At this point, either he or an assistant, observes the wheel to be balanced under the periodic illumination of the stroboscopic equipment as described earlier. It has been found that, while the vehicle body is vibrating at a resonance or "peak," the wheel assembly is not. The phase lead of the rotational position of the unbalancing mass with respect to the vibratory motion of the wheel assembly is therefor not 90° as in the earlier case considered. It has been determined by test that the phase lead in this case is very close to 135° for virtually all wheel assemblies of the type and class normally encountered in vehicle wheel balancing. The phase delay network which is above described has the capability of providing the frequency stable phase delay of 45° necessary to provide proper strobscopic operation as described earlier. This capability has not been available using economically practical circuit techniques known prior.

This change of phase delay is accomplished in the stroboscopic equipment by providing a switch, accessable to the operator, which electrically changes the ratio of the current source and current drain in the phase shift network, providing either a 2 : 1 ratio or a 4 : 1 ratio depending whether undriven or driven wheels are being balanced. Such a switch can be tapped into the resistance unit 31a (FIG. 6) to provide the desired ratio.

The foregoing specification has set forth the preferred apparatus, and the unique circuit network by which the objects of this disclosure are attained. Variation within the spirit of the disclosure are to be included within the scope of the invention.

What is claimed is:

1. A method of detecting the location of an unbalancing mass in a body rotatable on a horizontal axle movable in a vertical direction in response to the force developed by the unbalancing mass upon body rotation, the method consisting in selecting a reference point on the body, rotating the body and generating a signal voltage therefrom having a cyclic wave form corresponding to the vertical velocity of the body and in which the signal voltage switches, synchronously with the zero crossing of the cyclic wave form, a circuit network including a capacitor supplied with a reference voltage source and constant current source and drain means having a predetermined ratio to establish a frequency stable phase delay signal, said latter signal activating a stroboscopic light flashing device to illuminate the selected reference point in each rotation of the body, and utilizing the position of the illuminated reference point in detecting the location of the unbalancing mass.

2. The method of claim 1 wherein the capacitor is charged at a constant rate during one half cycle of the signal voltage and is subsequently discharged at twice that rate during the next half cycle consequently producing a lagging phase shift of 90° for providing a logical positional presentation of the unbalancing mass orientation at the resonant frequency of the supported body.

3. The method of claim 1 wherein the phase delay is obtained by charging and discharging a capacitor at constant rates in a time cycle to provide a 90° lagging phase shift of the signal voltage wave form.

4. The method of claim 1 wherein the phase delay is obtained by charging and discharging the capacitor at constant rates in a time cycle to produce a 45° lagging phase shift of the signal voltage.

5. The method of following a reference point on a body supported on an axle movable in a known direction in response to the rotation of the body having an unbalancing mass with an unknown orientation to the reference point for thereby locating the unbalancing mass, the method consisting in rotating the body at a speed corresponding to the resonant frequency of the body and supporting axle, generating a signal voltage having a cyclic wave form corresponding to the vibrational velocity of the body and supporting axle along a line in a known direction and in the plane of rotation, applying the generated cyclic signal voltage to trigger the charging and discharging of a capacitor at constant rates and in a known ratio to produce a frequency stable 90° phase delay signal with respect to the cyclic wave form of the generated voltage, triggering a stroboscopic light source by the delay signal to illuminate the reference point at each rotation of the body, and determining the angular relationship between the reference point and the unbalancing mass by the light flashes which shows up the location of the reference point in relation to a line through the center of rotation and parallel to the line of the known direction on which the unbalancing mass moves to cause the vibrational velocity of the body and supporting axle.

6. The method of claim 5 wherein the voltage adjustment is obtained upon charging and discharging a capacitor in a time cycle equal to the 90° lagging phase shift of the voltage wave form.

7. In apparatus for detecting the location of an unbalancing mass in a body rotatable on a supporting axle and movable in a given direction in response to the force developed by the rotating unbalancing mass, the improvement which includes: means to rotate said body through a sensible frequency range; means responsive to the vibrations of the body to generate a synchronous cyclic signal voltage corresponding to the velocity of the vibratory motion of said body; a predetermined reference index on said body; a circuit network including a capacitor, a reference voltage source connected to said capacitor, constant current source and constant current drain means connected to said capacitor, and means to apply said cyclic signal voltage to charge said capacitor through said constant current source at a constant rate through one half cycle of said signal voltage and to discharge said capacitor by said constant current drain at a rate which is a selected multiple of the charge rate, said charging and discharging being effected with respect to said reference voltage source to establish a frequency stable phase delay signal corresponding to the mechanical phase shift between the location of the unbalancing mass and the vertical velocity of said body in the sensible frequency range, and a stroboscopic flashing light device directed at said body and triggered by said phase delay signal to illuminate said reference index as it precesses to a position angularly related to the mechanical phase shift of the unbalancing mass upon said body rotating through said sensible frequency range.

8. The improvement set forth in claim 7 wherein said constant current source and drain means comprise circuits whereby said capacitor is charged up beyond said reference voltage by the constant current source in a period of time corresponding to the half cycle of the signal voltage, after which said constant current drain is active to reduce the charge in said capacitor to said reference voltage in half that time.

9. The improvement set forth in claim 7 wherein the ratio of said constant current source and constant current drain means is variable to permit detecting the location of an unbalancing mass at a predetermined sensible frequency other than resonance.

10. Apparatus for locating an unbalancing mass in a body mounted on an axle that is free to move in a known direction upon rotation of the body in response to the force developed by the rotating unbalancing mass, which known velocity of movement is indicative of a position on the circle of body rotation and lags behind the unbalancing mass position on the circle of body rotation; said apparatus consisting of means to rotate said body on said axle and at the resonant velocity of said body and said axle; generator means operatively connected to said axle to produce a signal voltage proportional to and synchronous with said body vibrations; an amplifier connected to receive said signal voltage; a point of reference on said body; a stroboscopic flashing light device directed at said body; an electrical network operatively connected between said amplifier and said light device, said network having constant current source and drain means, a capacitor, and a reference voltage source all interconnected in said network such that said constant current source and drain means control the charging and discharging of said capacitor relative to said reference voltage source and in a predetermined time sequence producing a frequency stable phase shift corresponding with the amount of lead between the position of the unbalancing mass and the resultant velocity of the body's vibratory motion, said network producing a voltage signal operative to fire said stroboscopic flashing light device and illuminate said reference point in a position determinative of the position of the unbalancing mass.

11. In apparatus for stroboscopically following a reference index on a rotating body having an unbalancing mass and in which the rotating body is supported on an axle movable in a predetermined direction in response to the force developed by the rotating unbalancing mass: the improvement of electronic means operatively responsive to body motion in its unbalanced rotating state for translating the frequency of the vibratory motion of said body into locating the unbalancing mass, said electronic means consisting of a signal voltage generator connected to said axle to produce a voltage signal proportional to the velocity of the vibratory motion of said body, meter means to monitor and display the signal voltage for visually reproducing the vibratory motion of said body such that the resonant frequency of said body where the rotational position of the unbalancing mass leads the resultant vibratory acceleration by substantially ninety degrees is revealed, a stroboscopic flashing light device directed at said body, a capacitor, a reference voltage source, and constant current source and drain means, said electronic means being connected in a network such that said constant current source and drain means control the charging and discharging of said capacitor relative to said reference voltage source in a time sequence and having a ratio to produce a frequency stable 90° phase shift and trigger said stroboscopic flashing light source to fire and illuminate said reference index in a position where the unbalancing mass is at a predetermined extremity of the direction of movement of said body.

* * * * *